United States Patent Office 3,533,716
Patented Oct. 13, 1970

3,533,716
PUMP SEAL
Albert Grün, Gross Auheim, Germany, assignor to Leybold-Heraeus-Verwaltung GmbH, Cologne-Bayental, Germany
Filed May 2, 1969, Ser. No. 821,267
Claims priority, application Germany, May 2, 1968, 1,703,324
Int. Cl. F04c 17/02, 27/00
U.S. Cl. 418—54    4 Claims

ABSTRACT OF THE DISCLOSURE

A rotating piston pump includes a rotating piston having a trochoidal shaped periphery and a pump housing having an internal chamber within which the piston is mounted for rotation. The chamber has a curved internal which closely engages a portion of the piston periphery as the piston rotates. A flexible sealing ledge is mounted in the pump chamber housing and engages the periphery of the rotating piston and maintains a pressure type seal between the chamber spaces on opposite sides of the ledge. The housing has a discharge opening leading from the internal recess including vent means, means for retaining a sealing fluid above the vent means, and means for directing the sealing fluid from the retaining means to a region on the inner wall of the chamber which is opposite the sealing ledge. The sealing fluid accordingly is well-positioned to form a good seal between the piston and the chamber wall.

BACKGROUND OF THE INVENTION

This invention relates to a vacuum pump utilizing a trochoidal shaped rotating piston, and, more particularly, to an arrangement for sealing the region between adjacent suction chambers. Hypotrochoidal pumps use a rotating piston of hypotrochoidal shape; that is, a shape generated by a point on a radius of a circle which rotates on the inside of a fixed circle. Such pistons are able to stay in general contact with the inner periphery of an appropriately shaped pump chamber as the piston rotates. The volume of the space between the chamber and the piston periphery varies as the pump rotates and accordingly pumping action results provided a good seal is maintained between the piston and the pump chamber periphery. Such devices are particularly useful as vacuum pumps for placing a space under a sub-atmospheric pressure. However, the extent of the achievable vacuum is presently limited by the efficiency of the sealing arrangement used to maintain a pressure difference between the piston and the chamber wall periphery.

One known arrangement for maintaining a seal is to mount a displaceable sealing ledge on the internal periphery of the chamber, which is so arranged that the sealing ledge remains in contact with the periphery of the piston at all times during its rotation. This ledge may be mounted on a portion, which in cross section is raised so that it extends from the chamber wall toward the piston periphery. Since only one sealing ledge may be provided and the piston contacts the chamber wall along a line of contact at each side of a rotating space between the piston and chamber wall, a good seal must also be maintained along the other line of contact. In one known arrangement this is done by providing oil which, at the conclusion of a compression operation of the pump will fall into the pump chamber, and which will, during the rotation of the piston during the compression operation be continually carried to the sealing ledge and will create an oil seal between the pressure and the suction connections of the pump. An oil film is created which not only forms a good seal along the line of contact at the other side of the space from the ledge, but improves the seal between ledge and piston as well.

This known arrangement, however, has a disadvantage in that its efficiency depends on the efficiency of the oil supply arrangement. The sealing oil is delivered into the pump chamber from a pressure connection of the pump which is arranged at the side of the pump housing. As a result, enough oil is normally not delivered in order to form a good seal between the piston periphery and the chamber wall. As a consequence, the pressure between the pressure and the suction sides of the pump tends to be equalized and a considerable reduction of the attainable end vacuum results.

SUMMARY OF THE INVENTION

The object of the present invention is to provide an efficient seal between the pressure and suction connections of a rotating piston hypotrochoidal pump.

A further object of the invention is to provide a sealing arrangement in which oil is delivered in sufficient quantity to form a good seal between the piston and the pump housing chamber wall.

Briefly stated, these and other objects of the invention are achieved by arranging the pump so that the angle between the pressure connection of the pump and the connection line between the highest point of a curved internal periphery of the pump chamber is arranged at a maximum of 30° to the vertical as measured in the direction of piston rotation and to provide a retaining means for the fluid sealing medium in the area overlying the pump opening such that the backward flowing sealing means is conducted to the inner wall of the pump chamber at a point opposite the said high point.

DESCRIPTION OF THE PREFERRED EMBODIMENTS

Figure 1:
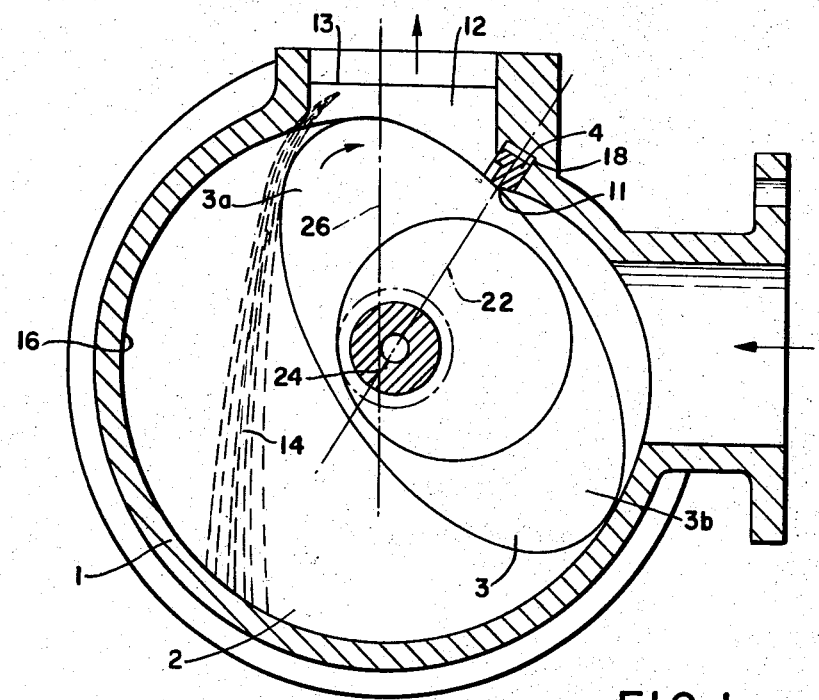
FIG. 1 is a sectional view through a rotating piston pump according to the present invention.
Figure 2:
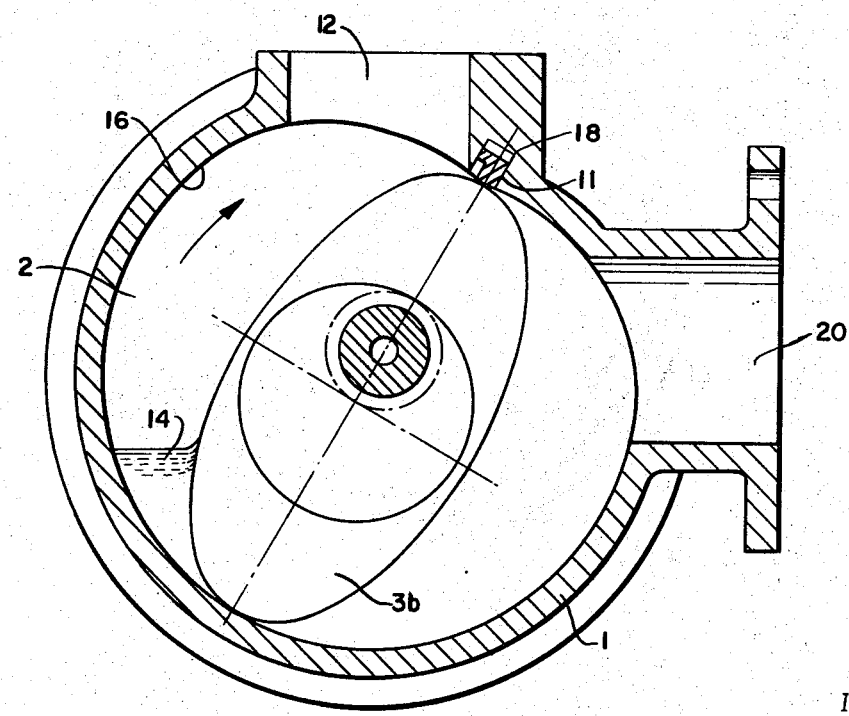
FIG. 2 is a sectional view similar to FIG. 1 showing the rotating piston in a different position.

A pump housing 1 ncludes a central chamber 2 within which a rotating piston 3 having the shape of a hypotrochoid in cross section is rotatably mounted. The internal periphery 16 of the housing chamber has a curved shape which corresponds to that of the rotating piston 3. Periphery 16 has a peak 11 which, in cross section, is curved smoothly out from the remainder of the periphery, and extends generally parallel to the axis of rotation of the rotating piston. A flexible sealing ledge 4 is arranged in a recess 18 in the housing wall along this peak 11. Sealing ledge 4 is biased outwardly.

A pressure connection 12 leads vertically from the pump chamber 2 and a suction connection 20 leads horizontally into chamber 2. The pressure connection 12 is located at an angle of approximately 30° from the sealing ledge 4. By this is meant that a line 22 passing through the sealing ledge and the center of rotation 24 of the piston intercepts a vertical line 26 passing through the pressure connection 12 at this angle. This angle is measured in the direction of rotation of the piston.

Directly above the rotating piston 3 the pressure connection 12 forms a vent 13 above which a sealing fluid 14 such as oil or the like accumulates. As piston 3 rotates and its upper lobe 3a as shown in FIG. 1 first passes into the region of the pressure connection 12, a portion of the oil 14 falls into the chamber 2. As the piston continues to rotate a larger amount falls in. Thereafter as rotation continues lobe 3b, as shown in FIG. 1, pushes this oil ahead of it and again lifts it up into the vent region 13. The piston periphery and the sealing ledge serves to retain this oil when the piston is in this position as a result of the inclination of the line between the sealing ledge and the center of rotation 24 to the vertical. During this rotational process a continuous oil film forms between respective lobe tips 3a or 3b and the periphery 16.

The design of the rotating piston 3, and of the shape of the interior of chamber 2 and its periphery 16 which co-operates with it are explained in detail in the United States patent of Maximilian Wutz No. 3,387,772 filed Feb. 1, 1966 and of common ownership with this application. The driving mechanism by pump is preferably an electro motor of any conventional structure. The sealing ledge 4 is per se conventional, and a number of different types are known. One type of sealing ledge is disclosed in the co-pending patent application of Wilhelm Erbskorn Ser. No. 789,891 filed Jan. 8, 1969 and of common ownership with this application.

The vent 13 is a conventional valve construction, and a number of different types are known. For example the valve could be a conventional leaf spring valve, whereby the leaf spring is located above the outlet opening of the pressure connection and is connected on one side with the housing wall. It is also possible to take a valve reed not connected with the housing wall. The valve reed is, for example, spring loaded and a stroke limitation is provided within the outlet opening of the pressure connection.

In all cases the vent 13 is oil overlayed and opens against the pressure created in the compression chamber of the pump. During the timing of the vent 13 the oil partially falls back into the chamber 2. This oil will, during the compression operation be continually carried to the sealing ledge 4 and will create an oil seal between the pressure and the suction connection 12, 20 of the pump. Other parts of the oil will be ejected from the chamber 2 and collected in the oil reservoir located above the vent 13.

As a result of the foregoing construction, a two-to-three fold improvement of the end vacuum is achieved. The reason for this is that a better seal is formed and the regions between the chambers are sealed off for a long peroid of time. The chamber is freed from a breaking of the oil seal by gas and a heavy and complicated oil conducting arrangement which would otherwise be required for the achievement of the same sealing effect are avoided by this simple construction.

It will be understood that the above description of the present invention is susceptible to various modifications, changes and adaptations.

What is claimed is:

1. A rotating piston pump comprising, in combination:
   (a) a rotating piston having a trochoidal shaped periphery;
   (b) a pump housing having chamber means, the periphery of which has a curved surface for closely engaging the periphery of said rotating piston which is mounted therein;
   (c) means mounting the rotating piston within the housing for rotation about a central axis with said piston periphery in engagement with the said curved surface of said chamber means;
   (d) a flexible sealing ledge and means mounting said flexible sealing ledge within the housing so that it projects outwardly and engages the said periphery of the rotating piston and maintains a pressure tight seal between the chamber means spaces on opposite sides of said ledge, said ledge being positioned so that the line between it and said central axis is inclined at a maximum of 30° to the vertical as measured in the direction of rotation of the piston; and
   (e) said housing having a discharge opening leading from said chamber means including vent means and means for retaining a sealing fluid above said vent means, and means for directing said sealing fluid from said fluid retaining means to a region on the inner wall of said chamber means which is opposite said ledge.

2. The combination defined in claim 1 wherein said central axis is horizontally arranged.

3. The combination defined in claim 2 wherein said discharge opening is mounted vertically above said central axis.

4. The combination defined in claim 2 wherein said sealing ledge meets the piston along a line of contact which is parallel to said piston's axis of rotation.

References Cited

UNITED STATES PATENTS

| | | | |
|---|---|---|---|
| 553,086 | 1/1896 | Wheildon | 103—130 |
| 1,636,486 | 7/1927 | Planche | 103—130 |
| 1,686,569 | 10/1928 | McMillan | 230—145 |
| 2,929,550 | 3/1960 | Sadler | 230—147 |
| 3,226,013 | 12/1965 | Toyoda et al. | |
| 3,387,772 | 6/1968 | Wutz | 230—145 |
| 3,458,120 | 7/1969 | Pfaff et al. | 230—145 |

MARK M. NEWMAN, Primary Examiner

W. J. GOODLIN, Assistant Examiner

U.S. Cl. X.R.

418—97, 125